United States Patent Office 3,399,224
Patented Aug. 27, 1968

3,399,224
DINITRILES
John R. Nazy and Donald H. Wheeler, Minneapolis, Minn., assignors to General Mills, Inc., a corporation of Delaware
No Drawing. Filed June 24, 1966, Ser. No. 560,081
9 Claims. (Cl. 260—464)

ABSTRACT OF THE DISCLOSURE

Dinitriles of the formula,

where R' is a monovalent straight chain saturated or ethylenically unsaturated aliphatic hydrocarbon radical containing 2 to 6 carbon atoms, R" is a divalent straight chain saturated or ethylenically unsaturated aliphatic hydrocarbon radical containing 7 to 11 carbon atoms, the sum of the carbon atoms in R' and R" is 13, and F is a divalent radical of the structure

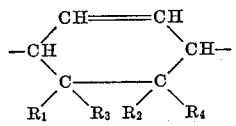

or

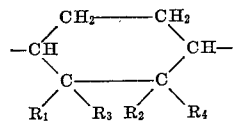

where $R_1$ and $R_2$ are H or $CH_3$ with the proviso that one of such radicals must be H and $R_3$ and $R_4$ are H or CN with the proviso that one of such radicals must be H and the other CN, are prepared by the ammination of an adduct of acrylonitrile and a lower alkyl ester of a conjugated fatty acid or by reacting acrylonitrile with a conjugated fatty acid nitrile. The dinitriles are useful in the preparation of diamines and dibasic acids used to prepare polyurea or polyamide polymers.

---

The present invention relates to novel dinitriles and, more particularly, to new dinitriles prepared from certain conjugated fatty acid compounds and certain dienophiles.

We have now discovered a new class of dinitriles having the idealized, general structural formula:

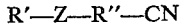

where R' is a monovalent straight chain aliphatic hydrocarbon radical containing 2 to 6 carbon atoms, R" is a divalent straight chain aliphatic hydrocarbon radical containing 7 to 11 carbon atoms, the sum of the carbon atoms in R' and R" is 13, and Z is a divalent radical of the structure

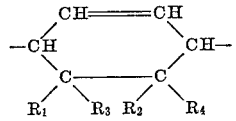

or

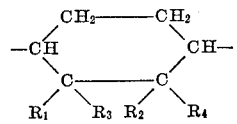

where $R_1$ and $R_2$ are H or $CH_3$ with the proviso that one of such radicals must be H and $R_3$ and $R_4$ are H or CN with the proviso that one of such radicals must be H and the other must be CN.

Our new dinitriles can be prepared in various ways. One preferred method is to first prepare an adduct of an acrylonitrile and a lower alkyl ester of a conjugated fatty acid and then convert the resulting mononitrile adduct to the dinitrile by reaction with ammonia. Another preferred method is to add an acrylonitrile to a conjugated fatty acid nitrile. The following examples serve to illustrate the preparation of the dinitriles of our invention using the above methods of preparation without limiting the same thereto.

EXAMPLE I

Three hundred seventy-nine grams of distilled methyl esters of tung oil acids (containing 88% by weight or 1.12 mole methyl α-eleostearate) and 214 g. (4.04 mole) acrylonitrile (containing 0.2% by weight p-methoxy phenol) were charged into a one liter Magne-Dash autoclave. After sealing the autoclave, the pressure was raised to 1500 p.s.i. by the addition of nitrogen gas. The reaction mixture was heated to an initial temperature of 153° C. and held at 150–161° C. for four hours. It was then allowed to cool to a temperature of 25° C. over a period of 1⅓ hours at which point the pressure was gradually released. The product was filtered and then vacuum pump stripped at 90° C. There was obtained 425.5 g. of a clear yellow liquid which was then distilled through a spinning band column to give 283 grams of the monadduct of acrylonitrile and methyl α-eleostearate (77% yield based on the conjugated methyl α-eleostearate).

A mixture of 268.5 g. (0.78 mole) of the monoadduct and 1.34 g. zinc oxide was charged into a 500 ml. round bottom flask equipped with a stirrer, thermometer, ammonia addition tube and gas trap. The mixture was heated at 275° C. as 251 g. ammonia was slowly bubbled through said mixture over a 24-hour period. The progress of the reaction was followed by subjecting small samples of the reaction mixture to infrared spectral analysis. At the end of the 24-hour reaction period, the reaction mixture was distilled through a spinning band column to give 78 g. of dinitrile boiling at 197–205° C./0.35 mm. Hg (33% yield) taking into account the seven analytical samples totaling 38.2 g. withdrawn during the reaction period). The dinitrile had the following properties:

Nitrogen content (Kjeldahl) _____percent__ 8.70
Refractive index $n_D^{25}$_____ 1.4931

The calculated nitrogen content of the dinitrile having the empirical formula $C_{21}H_{32}N_2$ is 8.97%.

EXAMPLE II

Example I was essentially repeated except that 175 g. (0.51 mole) of the monoadduct of acrylonitrile and methyl α-eleostearate was heated at 275° C. for 22 hours with 0.88 g. zinc oxide as 263 g. ammonia was bubbled through the mixture. The product was distilled as in Example I to give 41.5 g. of dinitrile having the following properties:

Nitrogen content (Kjeldahl) _____percent__ 8.70
Refractive index $n_D^{25}$_____ 1.4959
Boiling point, 187–194° C./0.32 mm. Hg.

Infrared spectra of the dinitriles of Examples I and II showed no 5.75 or 5.95 micron absorption bands indicating that the dinitriles were free of ester and amide groups. The spectra had bands at 4.45 and 4.49 microns, however, which are characteristic of nitriles. While not isolated, the dinitriles of Examples I and II consited essentially of isomers of the following structural formulae:

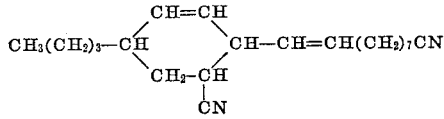

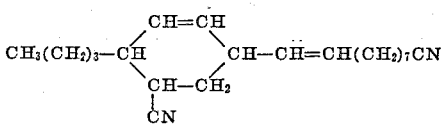

EXAMPLE III

Five hundred thirty-two grams of the monoadduct of acrylonitrile and methyl α-eleostearate prepared similarly as in Examples I and II and 26.6 g. palladium catalyst (10% on carbon) were charged into a Magne-Dash autoclave. The autoclave was sealed and the pressure raised to 1000 p.s.i. by addition of hydrogen gas. The temperature was raised from an initial 26° C. to 130° C. over a period of 25 minutes and then held at 114–132° C. over a period of 2⅓ hours with addition of hydrogen to maintain the pressure at about 1000 p.s.i. The product was then cooled to 38° C. over a 50-minute period and the pressure was gradually released. The product was washed out with chloroform, filtered twice and then the chloroform was stripped therefrom using a rotary evaporator up to 60–65° C. under a vacuum of 1.7 mm. Hg. There was obtained 519 grams of product which was distilled through a spinning band column to yield 388 g. of saturated monoadduct of acrylonitrile and methyl α-eleostearate.

Three hundred three grams of the saturated adduct (0.867 mole) and 1.515 g. zinc oxide were placed in a one liter three neck flask equipped with a stirrer and an inlet and outlet for ammonia with a cold water trap. The mixture was heated at 275° C. as 223 grams ammonia was bubbled therethrough over a period of 16 hours. The progress of the reaction was followed by subjecting small samples of the reaction mixture to infrared spectral analysis. At the end of the 16-hour reaction period, the reaction mixture was distilled through a spinning band column to give 217 g. of dinitrile having the following properties:

Nitrogen content (Kjeldahl) _____percent__ 8.85
Iodine value _____ 5.2
Refractive index $n_D^{25}$ _____ 1.1470

The dinitrile consisted essentially of a mixture of unisolated isomers of the following structural formulae:

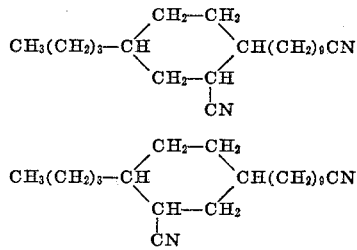

EXAMPLE IV

In a 2000 ml. flask fitted with thermowell, reflux condenser and addition funnel was placed 1084 g. of conjugated tall oil acid nitrile (containing 34% by weight or 1.46 mole conjugated linoleonitrile). One hundred milliliters (1.5 mole) acrylonitrile (containing 0.2% by weight p-methoxy phenol) and 0.5 g. iodine were added to the nitrile and then the reaction mixture was heated to reflux. The initial reaction temperature was 133° C. and the mixture was refluxed for 50 hours during which time another 100 ml. (1.5 mole) acrylonitrile and 10.5 g. iodine were added. The reaction temperature varied during the 50-hour reaction period from 110° C. to 142° C. Small samples were withdrawn during the reaction period to observe the progress of conjugation disappearance by infrared spectral analysis. After the reaction period was completed, the product was stripped under vacuum at 90° C. to remove unreacted acrylonitrile. The residue was then distilled through a spinning band column to give 251 g. of dinitrile which boiled at 219° C./56 mm. Hg and 212° C./0.45 mm. Hg (55% yield based on starting conjugated linoleonitrile taking into account the small analytical samples withdrawn). The dinitrile had the following properties:

Nitrogen content (Kjeldahl) _____percent__ 8.68
Iodine number _____ 89.4
Refractive index $n_D^{25}$ _____ 1.4805

The calculated nitrogen content and iodine number for the dinitrile having the empirical formula $C_{21}H_{34}N_2$ are 8.91% and 80.7, respectively. The dinitrile consisted essentially of a mixture of unisolated isomers of the following structural formulae:

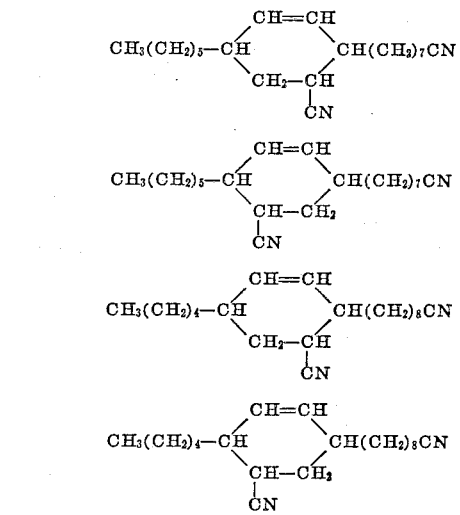

The starting conjugated nitrile used in the above Example IV was prepared from the distilled mixture of nitriles derived from tall oil acids, such mixture being available under the trade name. Alitrile 15D. The Alitrile 15D was heated at 140° C. with about 1% potassium t-butoxide for one hour to yield the starting conjugated nitrile.

EXAMPLE V

Into a 1000 ml. thermowell flask were charged 1.70 mole of the methyl ester of alkali conjugated linoleic acid (93% conjugated), 89 g. (1.68 mole) acrylonitrile (containing 0.2% by weight p-methoxy phenol) and 2.08 g. iodine. The mixture was heated at reflux for 37 hours during which time the pot temperature increased from 100° C. to 150° C. indicating that the reaction was 78% complete. The product was then heated under vacuum to remove unreacted acrylonitrile and distilled through a spinning band column to give a 65.5% yield of the monoadduct of acrylonitrile and the methyl ester of conjugated linoleic acid.

Three hundred thirty-two grams of the monoadduct as above prepared and 1.66 g. zinc oxide were placed in a one liter three neck flask equipped with a stirrer and an inlet and outlet for ammonia with a cold water trap. The mixture was heated at 275° C. as 270 g. ammonia was bubbled therethrough over a period of 18–19 hours. At the end of the reaction period, the reaction mixture was distilled through a spinning band column to give 224 g. of dinitrile having the following properties:

Nitrogen content (Kjeldahl) _____percent__ 8.93
Refractive index $n_D^{25}$ _____ 1.4797
Iodine number _____ 79.0

The dinitrile consisted essentially of a mixture of unisolated isomers having the same structural formulae as the mixture of Example IV.

A variety of other conjugated fatty acids and derivatives and dienophiles can be used in the preparation of our new dinitriles. Representative of the other dienophiles are acrylic acid, methacrylic acid, crotonic acid, the $C_1$ to $C_8$ alkyl esters of such acids, methacrylonitrile, propiolactone and the like. The conjugated fatty acids used in the preparation of the dinitriles of the present invention are those having two or more ethylenic bonds in the hydrocarbon chain, at least two of such ethylenic bonds being in conjugal relationship. Fatty acids containing 18 carbon atoms and two or more ethylenic bonds are commonly found in or derived from semi-drying and drying oils such as soy bean oil, tall oil, tung oil, linseed oil and the like. Specific illustrative 18 carbon atom acids are 9,12-octadecadienoic acid, 9,11-octadecadienoic acid, 10,12-octadecadienoic acid, 9,12,15-octadecatrienoic acid (linolenic acid), 6,9,12-octadecatrienoic acid, 9,11,13-octadecatrienoic acid (eleostearic acid), 10,12,14-octadecatrienoic acid (pseudoeleostearic acid) and the like. Derivatives of the described fatty acids can also be used in the preparation of the dinitriles of the present invention. Thus esters, such as the $C_1$ to $C_8$ alkyl esters, amides, nitriles, soaps and the like can be used. Where the fatty acid or derivative is unconjugated, conjugation of the double bonds can be effected by conventional techniques. Thus for example the acids and esters can be conjugated using well-known alkali conjugation techniques. Also, the nitriles can be conjugated using isomerization catalysts such as alkali metal alkoxides. Similar known techniques can be used for the amides and the like.

Example IV above demonstrates the addition of acrylonitrile to a conjugated fatty acid nitrile to directly produce a new dinitrile according to the present invention. Examples I, II and V demonstrate that acrylonitrile can be added to a conjugated fatty acid ester and then the ester group can be converted to a nitrile group to yield the new dinitriles. Our compounds can also be prepared from the acid or ester dienophiles with subsequent conversion of the acid or ester groups of the dienophile to nitrile groups. Thus our compounds can be prepared in numerous ways from a wide variety of starting materials.

The addition of the dienophile to the conjugated fatty acid or derivative can be effected at various temperatures, such as 80 to 300° C., and in the presence or absence of catalysts or polymerization inhibitors. In one preferred method, the adduct of the dienophile and the conjugated fatty acid or derivative is prepared at 80 to 250° C. in the presence of iodine. While not fully understood, it is believed that the iodine aids in the isomerization of the conjugated fatty acid or derivative to the trans, trans form which more easily condenses with the dienophile. Only small amounts of iodine are needed to effect this isomerization—i.e., such as from about 0.1 to 5% by weight based on the total reaction mixture.

The dinitriles of our invention wherein Z is

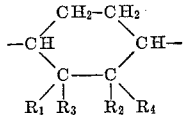

are prepared by selective hydrogenation. Thus the mononitrile adduct, for example having the radical

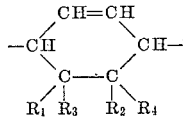

can be hydrogenated using a palladium catalyst as illustrated by Example III above. Then the remaining ester group can be converted to the CN group to form the dinitrile.

Our new dinitriles find valuable use as chemical intermediates. Thus they can be hydrogenated to diamines which in turn can be used to prepare valuable polyurea and polyamide polymers by reaction with urea, thiourea and polyacids such as adipic acid and the like. The diamines and the designated polymers derived therefrom are further described and claimed in our copending application entitled, "Diamines and Derivatives," Ser. No. 560,057, filed of even date. The dinitriles of our invention can also be converted to dibasic acids by saponification and the resulting dibasic acids can be used to prepare valuable polyamides by reaction with diamines such as ethylene diamine. The diacids can also be used to prepare polyesters which in turn find use as plasticizers and the like. Other uses of our dinitriles will become apparent to those skilled in the art.

It is to be understood that changes and variations may be made without departing from the spirit and scope of the invention as defined in the appended claims.

The embodiments of the invention in which an exclusive property or privilege is claimed are defined as follows:

1. Dinitriles of the formula:

$$R'—Z—R''—CN$$

where R' is a monovalent straight chain saturated or ethylenically unsaturated aliphatic hydrocarbon radical containing 2 to 6 carbon atoms, R'' is a divalent straight chain saturated or ethylenically unsaturated aliphatic hydrocarbon radical containing 7 to 11 carbon atoms, the sum of the carbon atoms in R' and R'' is 13, and Z is a divalent radical of the structure

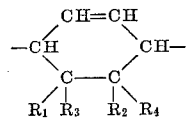

or

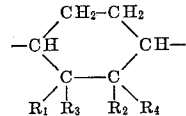

where $R_1$ and $R_2$ are H or $CH_3$ with the proviso that one of such radicals must be H and $R_3$ and $R_4$ are H or CN with the proviso that one of such radicals must be H and the other must be CN.

2. Dinitriles according to claim 1 wherein Z is

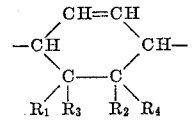

3. A dinitrile according to claim 2 wherein R' is $CH_3(CH_2)_3$— and R'' is —$CH=CH(CH_2)_7$—.
4. A dinitrile according to claim 2 wherein R' is $CH_3(CH_2)_4$— and R'' is —$(CH_2)_8$—.
5. A dinitrile according to claim 2 wherein R' is $[CH_3(CH_3)_5$—]$CH_3(CH_2)_5$— and R'' is —$(CH_2)_7$—.
6. Dinitriles according to claim 1 wherein Z is

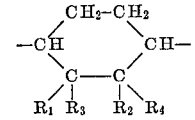

7. A dinitrile according to claim 6 wherein R' is $CH_3(CH_2)_3$— and R'' is —$(CH_2)_9$—.
8. A dinitrile according to claim 6 wherein R' is $CH_3(CH_2)_4$— and R'' is —$(CH_2)_8$—.
9. A dinitrile according to claim 6 wherein R' is $CH_3(CH_2)_5$— and R'' is —$(CH_2)_7$—.

References Cited

UNITED STATES PATENTS 2,534,088  12/1950  Webb _____ 260—464
3,296,293  1/1967  Strickland et al. _____ 260—464

CHARLES B. PARKER, *Primary Examiner.*

S. T. LAWRENCE III, *Assistant Examiner.*